United States Patent [19]

Bristow

[11] Patent Number: 5,083,339
[45] Date of Patent: Jan. 28, 1992

[54] APPARATUS FOR CLEANING HEADLIGHT LENS AND SIMILAR SURFACES

[75] Inventor: Stephen M. Bristow, Vancouver, Wash.

[73] Assignee: Sprague Aristo-Aire, Inc., Wilsonville, Oreg.

[21] Appl. No.: 430,664

[22] Filed: Nov. 10, 1989

[51] Int. Cl.⁵ .................. B60S 1/12; B60S 1/46; B60S 1/54; B60S 1/56
[52] U.S. Cl. .................. 15/250 A; 15/250.04; 15/250.02; 239/284.2; 417/396; 417/403
[58] Field of Search ........... 15/250 A, 250.01, 250.02, 15/250.04, 250.30; 239/284.1, 284.2, 322, 337, 329; 417/396, 403

[56] References Cited

U.S. PATENT DOCUMENTS

| | | | |
|---|---|---|---|
| 3,114,168 | 12/1963 | Taylor | 15/250.02 |
| 3,448,481 | 6/1969 | Jones, Jr. | 15/250.3 |
| 3,453,049 | 7/1969 | Wager, Jr. | 15/250 A |
| 3,456,278 | 7/1969 | Mandy et al. | 15/250 A |
| 3,469,088 | 9/1969 | Coleman et al. | 15/250.01 |
| 3,493,804 | 2/1970 | Fennell | 15/250 A |
| 3,574,882 | 4/1971 | Petry et al. | 15/250.02 |
| 3,641,613 | 2/1972 | Povilaitis et al. | 15/250 A |
| 3,689,955 | 9/1972 | Winkelmann | 15/250.30 |
| 3,719,819 | 3/1973 | Lowell | 15/250 A |
| 3,736,617 | 6/1973 | Ahlen | 15/250.22 |
| 3,893,203 | 7/1975 | Berkelius | 15/250.3 |
| 3,902,218 | 9/1975 | Bryant | 15/250.22 |
| 3,939,523 | 2/1976 | Kolbe et al. | 15/250.3 |
| 3,965,522 | 6/1976 | Pavey | 15/250 A |
| 4,026,468 | 5/1977 | Tinder et al. | 239/284.2 |
| 4,324,363 | 4/1982 | Rauen, Jr. | 15/250 A |
| 4,505,001 | 3/1985 | Fasolino | 15/250 A |
| 4,815,634 | 3/1989 | Nowicki | 239/322 |

FOREIGN PATENT DOCUMENTS

| | | | |
|---|---|---|---|
| 2422405 | 11/1975 | Fed. Rep. of Germany | 15/250.1 |
| 2654228 | 6/1978 | Fed. Rep. of Germany | 239/284.2 |
| 3842375 | 7/1989 | Fed. Rep. of Germany | 15/250 A |
| 2605906 | 5/1988 | France | 15/250 A |

Primary Examiner—Harvey C. Hornsby
Assistant Examiner—Gary K. Graham
Attorney, Agent, or Firm—Eugene M. Eckelman

[57] ABSTRACT

A nozzle arm is associated with an air-operated motor arranged to move the nozzle arm in a forward and return cycle across a headlight. The motor is a reversing air motor that includes a mixing chamber for pressured air and a cleaning fluid. The mixing chamber produces a mist under pressure that cleans the headlight in an efficient manner in one cycle of the arm. The motor is controlled in its movement by a cycling valve and an air operated relay valve. The nozzles on the nozzle arm are thin openings that form a pressured fan-like cleaning pattern.

8 Claims, 4 Drawing Sheets

APPARATUS FOR CLEANING HEADLIGHT LENS AND SIMILAR SURFACES

BACKGROUND OF THE INVENTION

This invention relates to new and useful improvements in an apparatus for cleaning headlight lens and similar surfaces.

The headlights of vehicles, and particularly trucks, often become dirty and in cold conditions will also become coated with ice. Devices have heretofore been employed which are intended to clean headlights. For example, U.S. Pat. No. 3,736,617 shows a motor driven blade that rotates while in contact with the headlight. U.S. Pat. No. 3,902,218 uses a reciprocating flexible cable that wipes across the headlight. U.S. Pat. No. 4,505,001 uses a whipping flexible tube driven by pressured fluid. U.S. Pat. No. 3,469,088 uses pressured air and liquid directed onto the headlight from a circumferential channel.

These prior devices accomplish various degrees of cleaning and at various efficiencies. However, it is considered that a most efficient cleaning is not accomplished by these prior devices under all conditions that may be encountered by vehicle headlights and particularly truck headlights. That is, wiper blades and other mechanical means will not efficiently remove stubborn coatings such as road grime, mud or ice without repeated cycles. These mechanical devices also have the disadvantage that they may scratch or otherwise damage the headlights, particularly plastic lens covers which are now commonly in use and which are susceptible to scratching. As to pressured water and air, it has been found that although such does not damage the headlights or covers therefor, they do not clean the headlights thoroughly and in a reasonably short time. Also, in the pressured liquid systems, the vehicle must carry a large volume of the cleaning liquid. Such is undesirable in view of the weight and bulk thereof.

SUMMARY OF THE INVENTION

According to the present invention, it is an object to provide a headlight cleaning apparatus that clears away road grime, mud and ice rapidly and efficiently in an improved manner without damage to the headlight.

A more particular object is to provide a headlight cleaning apparatus utilizing a novel air driven motor with means for developing pressured air and a cleaning liquid into a mist and also including conveying means for ejecting the pressured mist forcefully from the nozzle arm against the headlight to provide improved cleaning functions.

Another object is to provide a headlight cleaning apparatus that includes a positive displacement metering mixing chamber and piston whereby to be capable of utilizing a small amount of cleaning liquid in each cleaning cycle.

For carrying out these objects, the apparatus comprises a nozzle arm and drive means arranged to support this arm in front of a headlight with nozzle openings disposed in close proximity to the headlight but spaced therefrom. This drive means is arranged to move the nozzle arm in a forward and return single cycle across the headlight. The drive means comprises a reversing air motor that includes a mixing chamber for pressured air and a cleaning liquid. The mixing chamber produces a mist that is directed to the nozzle openings under pressure and that cleans the headlight in a thorough manner in one cycle of the nozzle arm. The air motor uses a rack and pinion therein for driving the nozzle arm and includes a mixing chamber that receives a cleaning liquid and pressured air from opposite directions to produce the mist. The motor is controlled in its operation by a cycling valve and an air operated relay valve. The nozzle arms include thin nozzle openings that form a pressured fanlike pattern that efficiently cleans the headlights.

The invention will be better understood and additional objects and advantages will become more apparent from the following description.

DETAILED DESCRIPTION OF A PREFERRED EMBODIMENT

Figure 1:
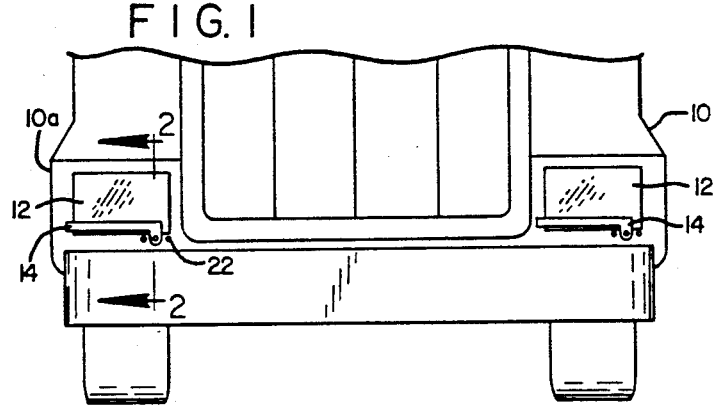
FIG. 1 is a fragmentary front elevational view showing a conventional truck with the present cleaning apparatus for the headlights mounted thereon.
Figure 2:
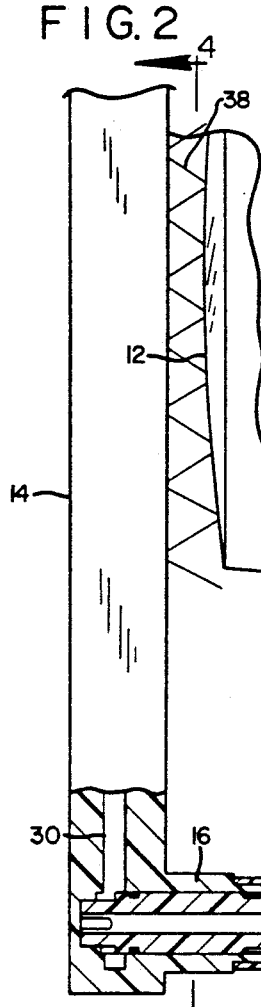
FIG. 2 is a cross sectional view taken on the line 2—2 of FIG. 1 and showing in detail mounting of a drive motor forming a part of the present cleaning apparatus.
Figure 4:
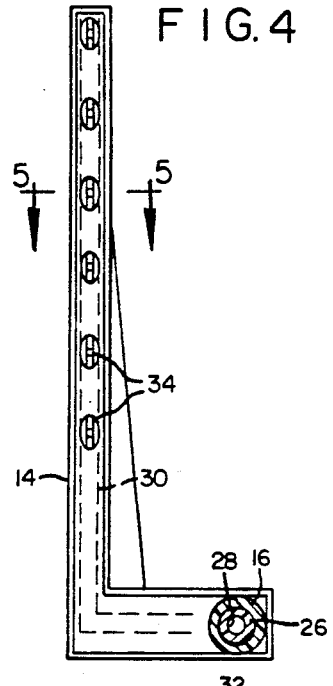
FIG. 4 is a sectional view in reduced scale of the nozzle arm taken on the line 4—4 of FIG. 2.
Figure 3:
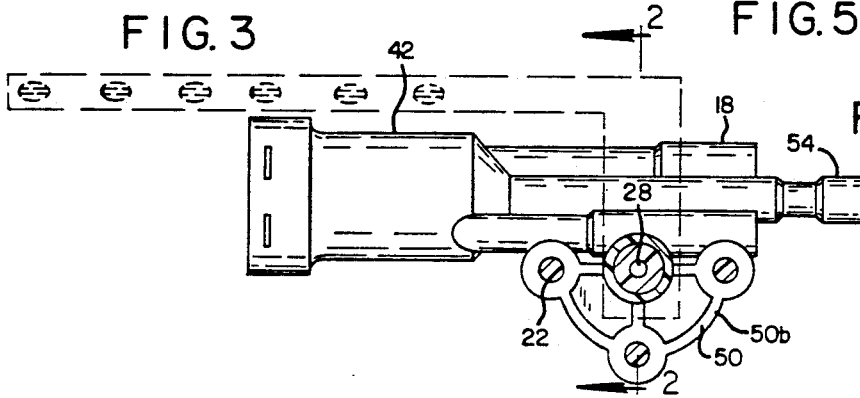
FIG. 3 is a front elevational view of the drive motor apart from the truck, a nozzle arm forming a part thereof being shown in phantom lines, taken on the line 3—3 of FIG. 2.
Figure 5:
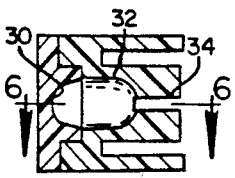
FIG. 5 is an enlarged fragmentary sectional view taken on the line 5—5 of FIG. 4.
Figure 6:
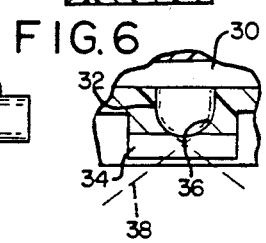
FIG. 6 is a fragmentary sectional view taken on the line 6—6 of FIG. 5, this view being turned 90° from FIG. 5.

The present invention was designed particularly and is illustrated herein for cleaning headlights of vehicles such as truck headlights or covers therefor. It is to be understood however that the apparatus can be used for cleaning any surface where a source of pressured air is available.

With particular reference to the drawings and first to FIGS. 1-6, the numerals 10 and 12 represent a conventional truck and headlight lens, respectively. The numeral 10a represents a front panel or hood of the truck. The invention includes a nozzle arm 14 for each headlight integral with lateral shaft housings 16 at one end which operate the arms rotatably in an arc of approximately 120 degrees. Shaft housings 16 are driven by air operated motors 18 mounted behind an existing front panel portion 10a of the truck. The shaft housings pass through openings 20 cut in the panel portion 10a, and the motors are mounted for secure support of these shaft housings in such openings by suitable means, as by cap screws 22, leading through the panel portion 10a from the front. As best apparent in FIG. 2, and important to the invention, the shaft housings 16 support the nozzle arms 14 at right angles thereto in close proximity but spaced from the front surface of headlight 12. Representative spacings from the lens are approximately ⅜ to 1 inch.

Each shaft housing 16 encloses a shaft 26 having an axial duct 28 therein establishing communication between the motor 18, to be described, and a longitudinal duct 30 in the nozzle arm. Duct 30 communicates with short lateral ports 32 that open through the arm surface facing the lens 12 in slits 34 that are narrowed in a direction which is at right angles to the arm, FIG. 5, but widened in a longitudinal direction, FIG. 6. The ports 32 meet the slits in opposite concaved curvatures 36, whereby a mixture of liquid and air forced from the nozzles is discharged in a thin, fan-like pattern 38 which under selected pressure and liquid-air mixture, to be described, provides effective cleaning of the headlights in most instances by a single pass of the nozzle over and back in front of the lens.

Figure 7:
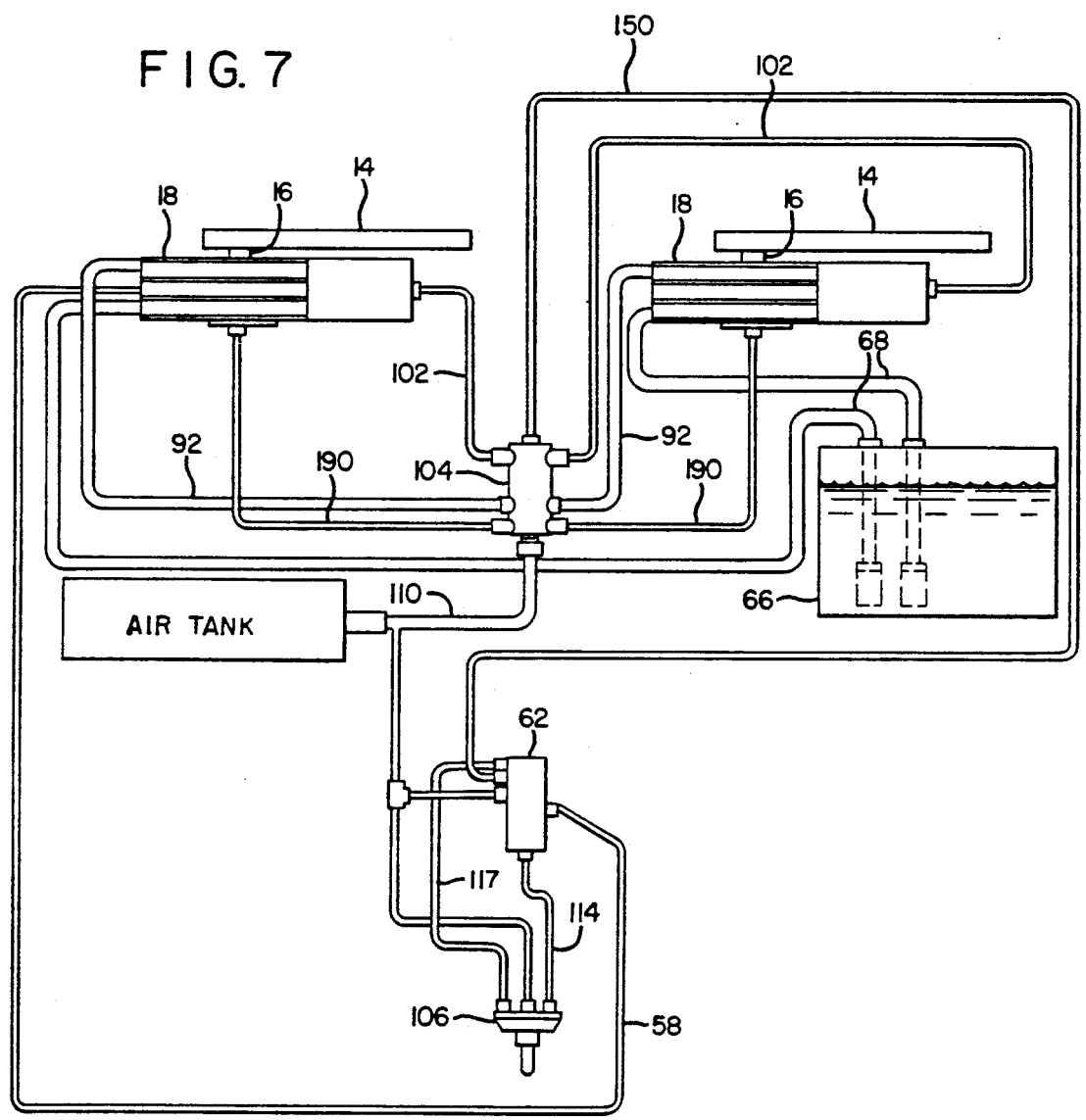
FIG. 7 is a general schematic view of the entire system of the invention.
Figure 8:
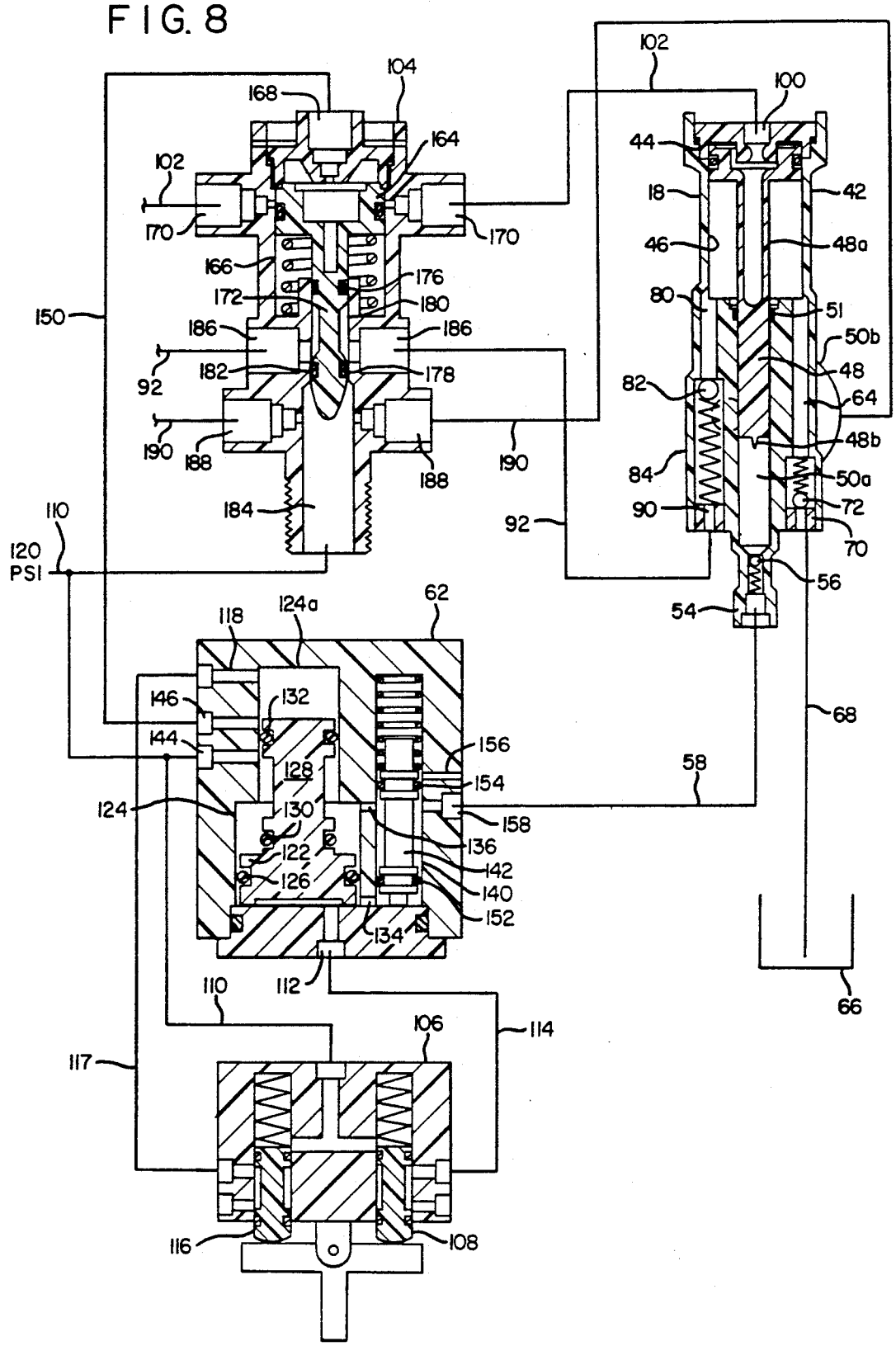
FIGS. 8 and 9 show details of the drive motor and control means in rest and actuated positions, respectively, these views being partially diagrammatic. Structural details of the drive motor are shown as if taken on the line 8—8 of FIG. 2.
Figure 9:
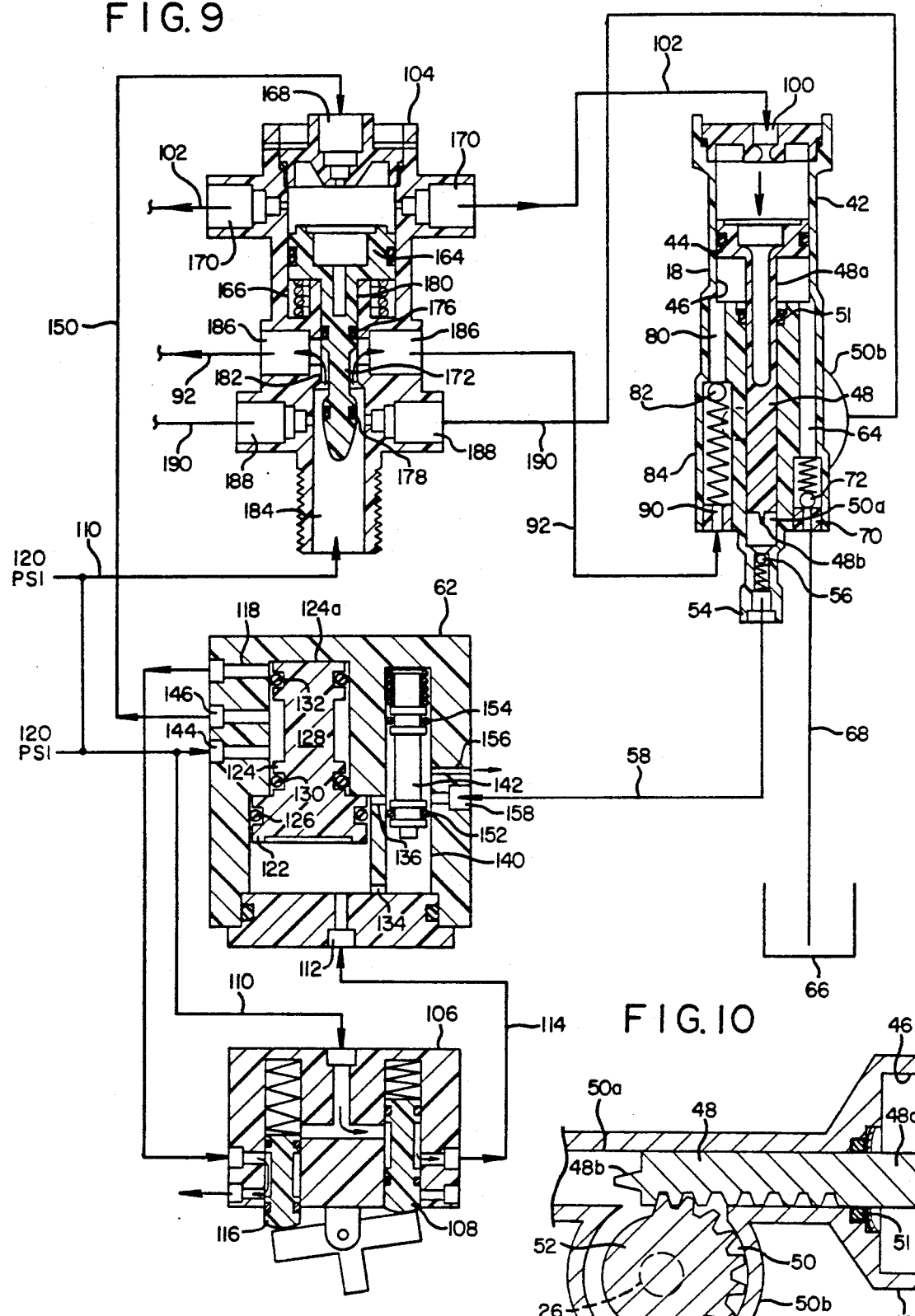
Figure 10:
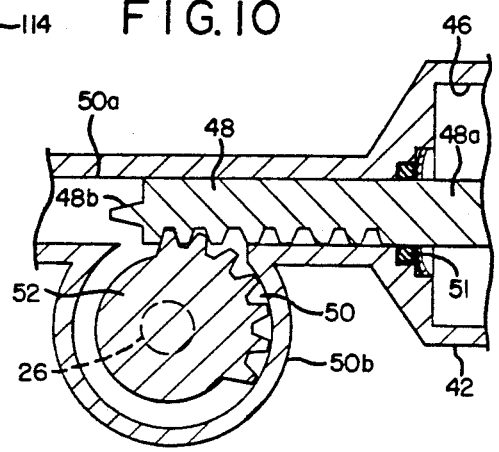
FIG. 10 is a fragmentary cross sectional view of the drive motor, taken on the line 10—10 of FIG. 2.

Motors 18, also seen diagrammatically in FIG. 7 and in more detail in FIGS. 8-10, comprise a housing 42 with a piston 44 operating in a cylinder portion 46 in the housing. Piston 44 of each motor has a piston rod portion 48 in the form of a rack that operates in a reduced diameter portion 50a of a gear chamber 50. Cylinder portion 46 and gear chamber portion 50 are sealed from each other by an O-ring seal 51 engageable with a tooth-free portion 48a of the rack. Rack 48 is in mesh with a pinion gear 52 in an enlarged portion 50b of the gear chamber, the pinion gear comprising an integral part of nozzle arm shaft 26 and arranged to drive the nozzle arm 14 over and back across the headlight in a forward and return movement of the piston 44 in the cylinder 46. Gear chamber 50 is sealed on the shaft side thereof by an O-ring seal 53. Gear chamber portion 50a has an inlet port 54 with a ball check valve 56 therein communicating through this port with a conduit 58 leading to a cycling valve 62, to be described. Ball check valve 56 is spring 120 psi. Rack 48 of one of the pistons has a projection 48b on its end which as will be seen upsets the check valve 56 in a reversing function of the cycle.

Motor housing 42 has a longitudinal liquid inlet duct 64 communicating between the cylinder 46 and a reservoir 66 on the vehicle. Duct 64 has an inlet port 70 having a check valve 72 therein capable of metering, in combination with a particular size of the inlet port, the flow rate of liquid that is drawn into the housing by a return movement of piston 44. As an example, the spring used at the check valve and the size of the inlet port are such that approximately one ounce of liquid is drawn in for each cycle.

Also communicating with cylinder 46 is a longitudinal liquid outlet duct 80 leading through a spring pressed ball check valve 82 to a mixing chamber 84. This mixing chamber includes a peripheral groove 86, FIG. 2, around the shaft and one or more diametral ports 88 leading from the groove to the duct 28 in the nozzle arm shaft 26. Advancing movement of the piston 44 in cylinder 46 drives cleaning liquid present in this cylinder into mixing chamber 84, 86 for mixing with pressured air, to be described. Also leading into mixing chamber 84 in a direction opposite from liquid inlet duct 64 is an air inlet duct 90 in communication with a conduit 92 capable of supplying pressured air to the mixing chamber.

Motor housing 18 also has an inlet 100 at the end of piston 44 which is connected to a conduit 102 capable of supplying pressured air to the motor. On-off flow of pressurized air to conduits 92 and 102 is controlled by an air-pressured operated relay valve 104.

The system includes an actuating switch 106 operated by the driver when functions of cleaning of the headlights are desired. This switch is used in combination with the cycling valve 62, relay 104, and portions of the motor for controlling the motor in such cleaning functions. As noted, the system uses pressured air as the power, such air being available on most trucks at approximately 120 psi.

The actuating switch 106 is conventional, having a first spring pressed plunger 108 controlling inlet air pressure from the vehicle pressure system 110 to one end port 112 at the piston end of cycling valve 62 through a conduit 114. A second plunger 116 in the switch 106 controls inlet of line pressure, by means of a conduit 117, to a port 118 at the other end of cycling valve 62 for cancelling a cycle, as will be more apparent hereinafter.

Cycling valve 62 has a piston 122 associated with the inlet port 112 and operative in a cylinder portion 124 of the valve having a reduced diameter portion 124a. This piston carries an O-ring seal 126 thereon and has a stem portion 128 leading into reduced diameter cylinder portion 124a and carrying a pair of spaced O-ring seals 130 and 132 associated with the cylinder portion 124a. Seal 126 is associated with ports 134 and 136 located at opposite ends of cylinder portion 124 and leading into a cylinder portion 140 of a bleed-off piston 142. O-ring seals 130 and 132 are associated with the cancel port 118, with a line pressure port 144, and with a port 146 intermediate ports 118 and 144 and communicating with the piston end of relay 104 by means of a conduit 150.

Bleed-off piston 142 is spring loaded toward the end adjacent port 134 and carries O-ring seals 152 and 154 associated with the ports 134 and 136 and also associated with an exhaust port 156 and a port 158 communicating with the conduit 58 that is connected into the reduced diameter portion 50a of the gear chamber 50.

Air operated relay valve 104 has a piston 164 therein operative in a cylinder portion 166 and spring loaded toward a port 168 at one end that communicates with conduit 150 from the cycling valve 62. Piston 164 is associated with and controls flow of air to ports 170 that lead to the ports 100 of the respective motors 18. Piston 164 has a stem 172 with two O-ring seals 176 and 178 thereon associated with reduced diameter portions 180 and 182, respectively, in the relay valve for controlling the inward flow of line pressure from a port 184 at the end of the relay valve opposite from the piston end to outlet ports 186 communicating with conduits 92 leading to the mixing chambers 84 of the motors. Port 184 is in constant communication with outlet ports 188 leading to respective gear chambers 50 by conduits 190 and thus these gear chambers are pressurized at all times.

OPERATION

In use, the motors 18 are mounted on the truck in a manner such that the nozzle arms in their rest position lie approximately parallel with the bottom edge of the headlight or cover 12, as seen in FIG. 1, and that in the throw of the arm back and forth it will travel past the lens in close but spaced relation thereto. In the deactivated condition of the system, FIG. 8, switch 106 is of course centered whereby pressure in one branch of line 110 dead ends in the switch. Line pressure also extends into port 144 and holds the piston 122 in the cycling valve at the end adjacent port 112. In this position of the piston 122, line pressure also exists in the port 136 between piston 122 and bleed off valve 142. This same line pressure exists in cylinder 140 of bleed off piston 142 and this valve is balanced by line pressure but held at the same end of the control module as piston 122 by spring pressure Line pressure in this deactivated condition of the system exists in conduit 58. Line pressure is always present in the gear chambers 50, 50a through relay inlet port 184, outlet ports 188 and conduits 190, the ball check valves 56, as stated, being designed to hold firmly against line pressure The piston 44 is held in its retracted position by line pressure in gear chamber 50a working against the small end of rack 48, as will be more apparent hereinafter. Port 146 of the cycling valve is isolated from line pressure 144 with the result that the relay piston 164 is held retracted by pressure in port 184 and air spring pressure in cylinder portion 166. In this condition of the relay, line pressure is not present at the piston end of the relay and thus ports 186 associated with conduits 92 leading to the motor mixing chambers 84 and ports 170 associated with conduits 102 to the piston 44 are not pressurized.

When a cleaning cycle is desired, the switch 106 is momentarily flipped in a direction which depresses the plunger 108 associated with conduit 114, FIG. 9. This puts line pressure in port 112 of cycling valve 62 and piston 122 is driven to the opposite end of its cylinder. This pressure also travels through port 134 to drive bleed off piston 142 to an inner position with its spring compressed. Such travel of the bleed off piston opens port 158 to atmosphere through port 156 and the pressure in line 58 is thus relieved. As soon as the switch lever is released, the pressure at the port 112 is shut-off and the bleed off piston will return under spring pressure. Piston 122 maintains its inner driven position by pressure on its stem entering line pressure port 144 and exiting through port 146.

In the inner or driven position of the piston 122, line pressure flows to the port 168 of relay 104 and drives the relay piston to its inner or driven position of FIG. 9, whereby line pressure flows to the ports 100 of motor pistons 44 by means of ports 170 in the relay and conduits 102, and also line pressure flows to the inlet ducts 90 of the mixing chambers 84 through ports 186 in the relay and through lines 92. Thus, motor pistons 44 are driven inwardly and force liquid that exists in cylinders 46 into mixing chambers 84. This occurs simultaneously with line pressure being admitted to the mixing chambers from the opposite direction through ducts 90, thus producing a mist and forceably discharging it through nozzle openings 34 via ports 88 in the mixing arm shaft, through shaft duct 28 and through nozzle arm duct 30. The inward driving movement of motor pistons 44 also at the same time rotates the nozzle arm across the headlights in a cleaning function by driving engagement of the rack 48 on the spur gear 52.

The return movement of the nozzle arms is initiated by the rack 48, wherein when the rack with the projection 48b thereon has completed movement in the one direction, the projection upsets the ball check valve 56 and re-pressurizes conduit 58 from the pressure in constant pressure gear chamber 50. Bleed off piston 142 has returned to its FIG. 8 position prior to this function and thus pressure in conduit 58 and port 158 enters port 136 of the cycling valve 62 and applies a force against O-ring 126 of piston 122. This causes the piston 122 to return which shuts off line pressure to the relay and thus to the ports 100 for driving the motor pistons 44. Relay piston 164 now returns and shuts off line pressure to the mixing chambers 84.

Since the inward driving pressure of motor pistons 44 has been removed, the pressure in gear chambers 50 and particularly gear chamber portion 50a acts against the racks 48 and returns the pistons 44 to the original position. Although the piston area of the racks is quite small, it is sufficient to drive the pistons back. As the pistons return, cleaning liquid is drawn in through ball check valve 72 and duct 64. The spring pressure against this ball and the size of port 70 is preselected to provide a controlled speed of return of the nozzle arm. The system is now in readiness for the next cycle.

In the event the driver wishes to cancel the cycle that is in progress, the switch 106 is flipped in the opposite direction from that shown in FIG. 9, whereby line pressure is directed to port 118 in the cycling valve to move the piston 122 back to its starting position and shut off pressure to the relay 104. Thus, the parts are thrown in their return portion of the cycle and the pressure in gear chamber will return the piston 44 in readiness for the next cycle.

According to the present invention, a cleaning system is provided that uses a pressured mixture of a cleaning liquid and air to dissolve and blow dirt etc. from headlights. Using the conventional air system on trucks, which as stated is approximately 120 psi, a rather high pressured impingement of the cleaning mist against the headlights is accomplished and one that has been found to clean the headlights usually in one cycle. In stubborn cases, an extra cycle may be initiated. By using a suitable cleaning solvent, dirt, road grime, and ice is readily dissolved.

The shape of the nozzles contributes to the improved cleaning function as well. That is, with reference to FIGS. 5 and 6, and as noted hereinbefore, the pressured mist is directed outwardly through narrow slits 34 and in such outward movement is formed into a fan shape 38 by curved surfaces 36 of ports 32 that lead into the slits. This structure has been found to provide a very efficient cleaning function.

Another feature of the invention comprises the positive displacement, metering discharge of cleaning fluid. Such positive displacement system, in combination with the pressured liquid and air mist, strictly controls the liquid necessary in each cycle which has been found to approximate only one ounce per cycle. Thus, it is apparent that a minimum volume of cleaning liquid is required to be carried and this reduces the overall weight of the vehicle. The forward and return stroke of the motor pistons is regulated by internal check valves 82 and 72, respectively.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. Cleaning apparatus for a headlight surface of vehicles having a pressured air supply on board and a reservoir of cleaning liquid, said apparatus comprising:

a motor housing, mounting means on said housing for mounting it on a vehicle adjacent the headlight surface, a cylinder portion in said housing in which a piston is driven in forward and reverse movements, a shaft supported on said housing having opposite end portions, one end portion of said shaft projecting laterally from said housing whereby to be disposed forwardly of the headlight surface and the other end portion having a driving connection with said piston whereby the shaft is driven in reciprocating rotation by forward and reverse movements of said piston, an arm member mounted on said one end portion of said shaft at right angles thereto and in spaced parallel relation with said housing forwardly of the headlight surface for sweeping movement across the headlight surface in close proximity thereto but in spaced relation, outlet nozzles on said arm member directed toward the headlight surface, mixing means in said housing operably associated with said cylinder and piston whereby to combine the pressured air supply on the vehicle and cleaning liquid from the reservoir into a pressured mist, and conveying means in said motor housing, shaft, and arm member for directing said pressured mist to said nozzles for cleaning the headlight surface as said arm member sweeps thereacross.

2. The cleaning apparatus of claim 1 wherein said conveying means includes ducts extending through said shaft and said arm member establishing communication between said mixing means and said nozzles.

3. The cleaning apparatus of claim 1 wherein said conveying means comprises a longitudinal duct in said arm member, a plurality of lateral ports leading from said duct toward the headlight surface and terminating in said outlet nozzles, said outlet nozzles comprising thin longitudinal openings producing a thin pattern of spray of said mist against the headlight, said lateral ports joining with said thin longitudinal openings in a concaved wall portion whereby pressured mist flowing from said ports to said openings is shaped into a crisscross, fan-like pattern.

4. The cleaning apparatus of claim 1 wherein said piston is operated in its forward and reverse movement by the pressured air supply on the vehicle.

5. The cleaning apparatus of claim 1 wherein said piston has a rod extension, and gear means connecting said rod extension to said other end of said shaft.

6. The cleaning apparatus of claim 5 wherein said gear means includes a rack and pinion.

7. Cleaning apparatus for a headlight surface for vehicles having a pressured air supply on board and a reservoir of cleaning liquid, said apparatus comprising:

an arm member including outlet nozzles thereon, support means operably connected to said arm member for supporting said arm member on a vehicle in front of a headlight surface with said nozzles in close proximity but in spaced relation therefrom, a reversing motor in said support means operated by the pressured air supply on the vehicle in forward and return movements, said reversing motor comprising a piston operable in forward and return movements to drive said arm member, cycling means controlling air supply to said motor in its reversing functions, and a projection on said piston for tripping said cycling means to initiate said return movement, mixing means for connection to the pressured air supply on the vehicle and with the reservoir of cleaning liquid through said support means and for converting pressured air and cleaning liquid into a pressured mist, and conveying means in said support means and arm member for directing said pressured mist through said nozzles against the headlight surface.

8. The cleaning apparatus of claim 7 including rack and pinion means associated with said piston for driving said arm member.

* * * * *